United States Patent [19]
Nero
[11] 3,859,544
[45] Jan. 7, 1975

[54] ACTIVE CIRCUIT FOR DELAYING TRANSIENT SIGNALS IN A TELEVISION RECEIVER

[75] Inventor: Leroy W. Nero, Fort Wayne, Ind.
[73] Assignee: Warwick Electronics Inc., Chicago, Ill.

[22] Filed: Apr. 11, 1973
[21] Appl. No.: 350,113

[52] U.S. Cl. .................. 307/293, 307/263, 307/268, 328/55, 328/170, 328/223, 178/5.4 R, 178/DIG. 34
[51] Int. Cl. ....................... H03k 17/26, H03k 5/159
[58] Field of Search... 178/5.4 R, DIG. 25, DIG. 34; 307/263, 268, 293; 328/55, 170, 223

[56] References Cited
UNITED STATES PATENTS

| | | | |
|---|---|---|---|
| 3,189,756 | 6/1965 | Hopengarten et al. | 307/268 |
| 3,204,130 | 8/1965 | Hickey | 307/268 |
| 3,226,567 | 12/1965 | Bradmiller et al. | 307/268 |
| 3,433,980 | 3/1969 | Swaluw | 328/55 |
| 3,588,547 | 6/1971 | Greenblum | 328/55 |
| 3,641,371 | 2/1972 | Cartwright | 328/55 |
| 3,786,283 | 1/1974 | Iida | 307/293 |

*Primary Examiner*—Stanley D. Miller, Jr.
*Attorney, Agent, or Firm*—Hofgren, Wegner, Allen, Stellman & McCord

[57] ABSTRACT

A delay circuit for use in the luminance channel of a color television receiver whereby luminance information is delayed in order that it shall arrive at the cathode ray tube concurrently with corresponding chroma information included in the original transmitted television signal. The delay circuit additionally provides preshoot for improved crispness of the television picture. The circuit may be arranged to provide overshoot for further improved crispness and means may be incorporated in the circuit for providing manual adjustment of the amount of overshoot as desired.

15 Claims, 4 Drawing Figures

ACTIVE CIRCUIT FOR DELAYING TRANSIENT SIGNALS IN A TELEVISION RECEIVER

BACKGROUND OF THE INVENTION

1. Field of the Invention

This invention relates to television receiver circuits and in particular to an active delay circuit for synchronizing the arrival of luminance and chroma information at the cathode ray tube.

2. Description of the Prior Art

In present conventional color television receivers, the luminance information in the television signal must be delayed relative to the chroma information so as to reach the cathode ray tube at the same time. Conventionally, the delay is effected by passive circuit means located between two stages of the video amplifier. One example of such a passive delay circuit is illustrated in Engel et al. U.S. Pat. No. 3,643,011. Conventionally, the delay circuit includes a relatively large inductor and capacitor means.

In one form of television receiver, a circuit is used wherein matrixing of the luminance and chroma information takes place prior to the delivery thereof to the cathode ray tube. Such receivers are conventionally identified as RGB receivers.

The present invention comprehends an active delay circuit for delaying the luminance information approximately 0.3 microseconds. A number of active time delay devices have been developed such as shown in Bradmiller et al U.S. Pat. No. 3,226,567.

It has further been found desirable to provide improved crispness of the television picture, i.e., improved definition of the edges between black and white areas of the picture, to minimize eye strain in viewing the picture and to provide an overall improved viewing effect. One example of circuitry for providing such improved crispness is disclosed in Loughlin U.S. Pat. No. 2,678,389. As discussed in the Loughlin patent, a technique for obtaining such improved crispness is to provide preshoot and overshoot in the luminance signal so as to increase the gradient of the transient signal defined by the steep waveform representing such a transition and to actually cause the electron beam current of the cathode ray tube to drop below that corresponding to black and rise above that corresponding to white momentarily at the beginning and end of the transition.

SUMMARY OF THE INVENTION

The present invention comprehends an improved active delay circuit for providing from a steep waveform input signal a delayed output signal which includes preshoot characteristics and which may also selectively include overshoot characteristics. Where overshoot characteristics are provided, adjustable means may be incorporated for adjusting the amount of overshoot as desired by the user. The present invention avoids the relatively costly and complicated approaches shown in the prior art. For example, the present invention does not rely on addition of a double differentiated waveform to the original luminance signal as in one prior art circuit. Further, the present invention avoids the adding of an integrated and differentiated waveform together to obtain the desired delay with corresponding preshoot characteristics.

More specifically, the present invention comprehends the use of a resonant circuit which is shock excited to provide a component signal adapted to be combined with a signal corresponding to the original luminance signal to provide the desired time delayed luminance signal incorporating preshoot characteristics. Where rapid transitions are desired, the resonant circuit provides a delayed luminance signal having a rise time which is effectively independent of the rise time of the original luminance signal so as to provide improved crispness. Further, the rise time characteristics may be readily preselected by suitable selection of the resonant circuit component values to provide a desired degree of crispness by adjustable control of the preshoot characteristics.

By suitably arranging the resonant circuit, overshoot characteristics may also be provided in the delayed luminance signal. The present invention permits incorporation of overshoot by allowing the resonant circuit to ring while providing a controlled damping of the ringing to limit the ringing preferably to a single overshoot excursion. The circuit may be provided with adjustable damping means to vary the amount of ringing, thereby varying the amount of overshoot as desired by the user to permit correlation of the picture crispness with the individual user's tastes. The adjustability may be readily effected in the present delay circuit by merely providing a potentiometer in the resonant circuit.

BRIEF DESCRIPTION OF THE DRAWINGS

Other features and advantages of the invention will be apparent from the following description taken in connection with the accompanying drawings wherein.

DESCRIPTION OF THE PREFERRED EMBODIMENT

Figure 1:
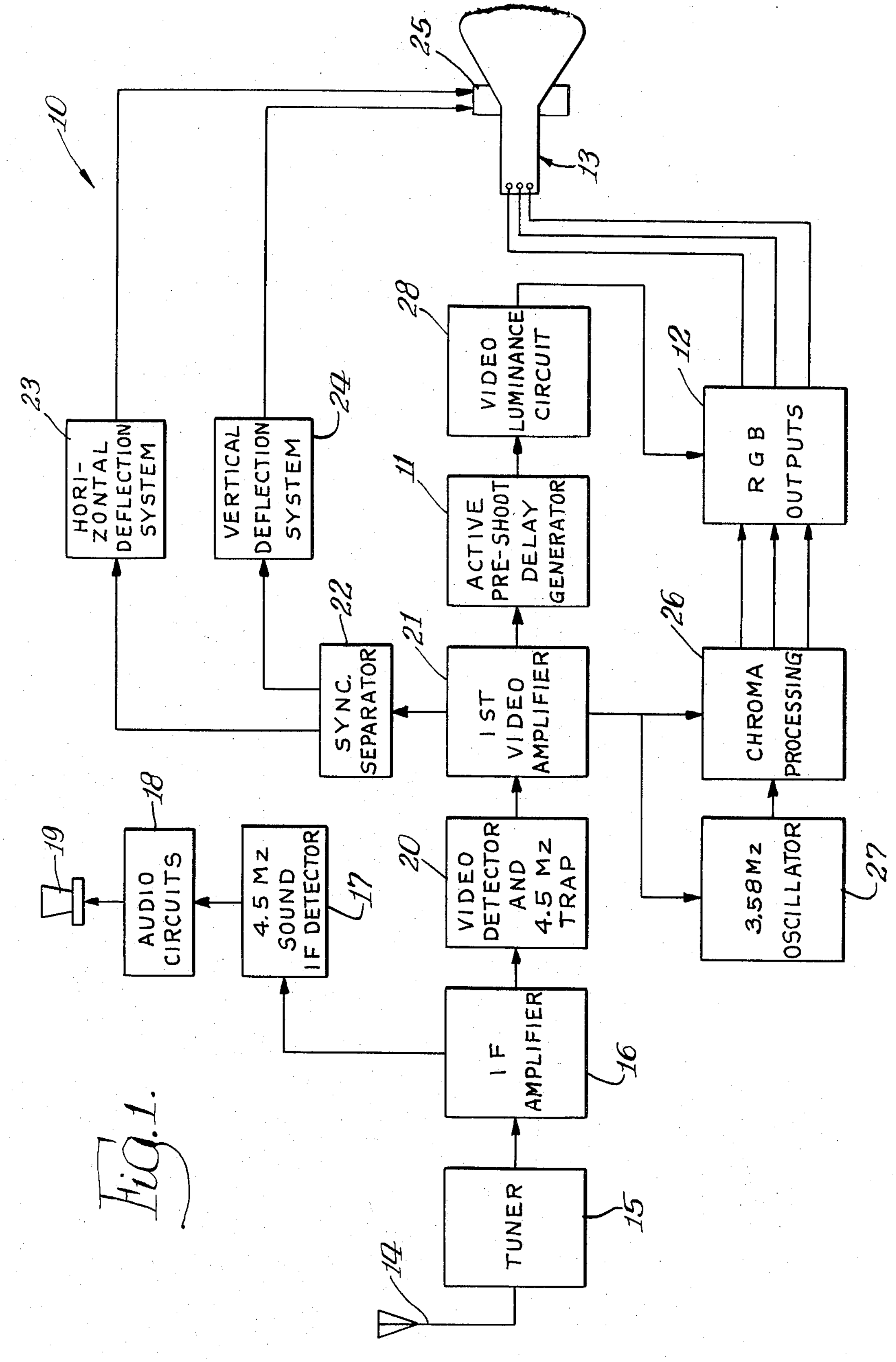
FIG. 1 is a block diagram of a television receiver utilizing a luminance signal delay circuit means embodying the invention.

In the exemplary embodiment of the invention as shown in the drawings, a color television receiver generally designated 10 is shown to include an active preshoot-delay generator circuit 11 for delaying the video luminance information prior matrixing with the chroma information in an RGB output section 12 whereby the synchronized luminance and chroma information may be delivered to the cathode ray tube 13. In RGB receivers, luminance information must be delayed on the order of 0.3 microseconds relative to the chroma information. This rather short delay can be effected by an active circuit avoiding the relatively bulky and costly passive circuit structures of the prior art. The present invention comprehends an improved form of such an active delay circuit.

More specifically, the television receiver 10 may comprise a generally conventional RGB receiver including a conventional antenna 14 providing the RF video signal to a tuner 15. The RF signal is delivered from tuner 15 to an IF amplifier which conventionally includes a plurality of individual amplifier stages. The 4.5 MHz. signal component is delivered from amplifier 16 to a sound IF detector circuit 17 and the audio frequency signal delivered therefrom is passed through conventional audio amplifier circuits 18 to the loudspeaker 19.

The video information is passed from IF amplifier 16 to a video detector circuit 20 which includes means for trapping any remaining 4.5 MHz. signal. The detected video information is then passed to a first video amplifier 21. A Sync separator circuit 22 detects the horizontal and vertical synchronizing pulses in the signal at video amplifier 21 and provides corresponding synchronized signals to the horizontal deflection circuit 23 and vertical deflection circuit 24 to be applied to the horizontal and vertical deflection coils 25 of the cathode ray tube 13.

Chroma information is detected in video amplifier 21 and passed to a chroma processing circuit 26 having a 3.58 MHz. signal concurrently delivered thereto from a local oscillator 27. The chroma processing circuitry 26 utilizes the chroma information and 3.58 MHz. signal in delivering to the RGB circuit 12 individual signals indicating the strength of the red, green and blue components of the chroma information.

The luminance information component of the input signal is detected in amplifier 21 and delivered to the delay generator circuit 11 which, as discussed above, delays the luminance information on the order of 0.3 microseconds. As will be brought out more fully hereinafter, delay generator circuit 11 introduces into the delayed signal a preshoot characteristic and, selectively, an overshoot characteristic. The output of delay generator circuit 11 is delivered through a video luminance circuit 28 to the RGB output circuit 12 in synchronization with the chroma information for matrixing of the luminance and chroma information and delivery to the cathode ray tube 13.

Figures 2, 3, 4:
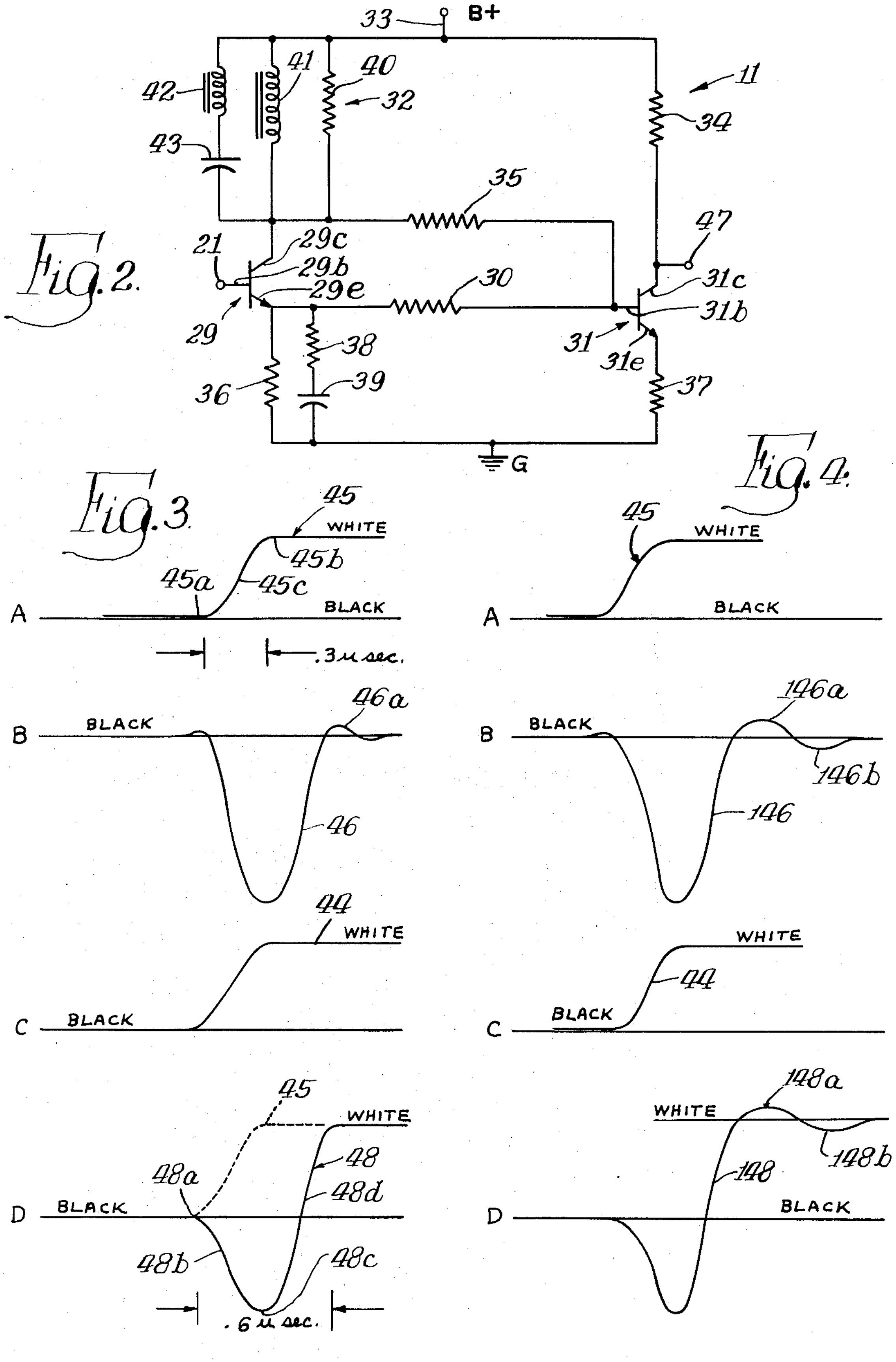
FIG. 2 is a schematic wiring diagram of the luminance signal delay circuit.
FIG. 3 is a waveform diagram illustrating the make-up of the delayed luminance information signal.
FIG. 4 is a waveform diagram illustrating the make-up of the delayed luminance information signal incorporating overshoot characteristics.

Turning now to FIGS. 2–4, the structure and operation of the delay generator circuit 11 will be considered. As shown in FIG. 2, the delay generator circuit includes an input transistor 29 for receiving the luminance signal from video amplifier 21. The luminance signal is applied to the base **29*b* of transistor 29 and a signal generally corresponding thereto is delivered from the emitter 29*e* through a resistor 30 to the base 31*b* of an output transistor 31. The collector 29*c* of transistor 29 is connected through a resonant circuit 32 to the B+ power supply 33. A load resistor 34 is connected between the collector 31*c* of the output transistor 31 and B+ power supply 33 and a third resistor 35 is connected between collector 29*c* of input transistor 29 and base 31*b* of output transistor 31. Emitter 29*e* is further connected through a resistor 36 to ground G and emitter 31*e* of output transistor 31 is connected through a resistor 37 to ground G. A filter comprising a series connection of a resistor 38 and capacitor 39 is connected in parallel with resistor 36 between input transistor emitter 29*e*** and ground G.

The resonant circuit 32 includes a parallel arrangement of a resistor 40, an inductor 41, and series connected second inductor 42 and capacitor 43. Parameters for circuit 11 may be as follows:

| | | |
|---|---|---|
| B+ Voltage | 33 | 20 volts |
| Resistor | 30 | 1.5 kilohms |
| Resistor | 34 | 1 kilohm |
| Resistor | 35 | 3.3 kilohms |
| Resistor | 36 | 390 ohms |
| Resistor | 37 | 180 ohms |
| Resistor | 38 | 220 ohms |

-Continued

| | | |
|---|---|---|
| Resistor | 40 | 1 kilohm |
| Capacitor | 39 | 1000 picofarads |
| Capacitor | 43 | 82 picofarads |
| Inductor | 41 | 100 microhenrys |
| Inductor | 42 | 22 microhenrys |

The operation of circuit 11 is best understood in conjunction with waveform diagrams of FIGS. 3 and 4. More specifically, a delay in the transmission of the luminance information between input transistor 29 and output transistor 31 of the delay generator circuit 11 is effected by modifying a signal 44 generally corresponding to the input signal 45 as delivered to amplifier 21, which signal 44 is passed from emitter **29*e* through resistance 30 to the base 31*b* of the output transistor 31. When transistor 29 is driven into saturation, resonant circuit 32 generates a shock excited damped wave 46 which is delivered through resistor 35 to the base 31*b* of output transistor 31 to be summed with wave 44 and produce at the output terminal 47 the modified, time delayed output signal 48**.

As shown in FIG. 3, the input luminance information signal 45, in passing from a black condition **45*a* to a white condition 45*b*, may have a relatively steep waveform so as to have a total transition time of approximately 0.3 microseconds. While such a rapid transition luminance signal presents a reasonably sharp transition in the picture at the black-white edge thereof, it is desirable to provide as steep a waveform as possible to provide maximum sharpness at the edge. Further, it has been found desirable to provide in the signal a "preshoot" characteristic whereby the signal is driven downwardly so as to produce, in effect, a blacker than black condition on the cathode ray tube. Thus, as shown in FIG. 3D, output signal 48, rather than immediately rising from the initiation point 48*a* to the white condition, firstly defines a downturned portion 48*b* which upon reaching the nadir 48*c* produces a maximum blacker than black signal. The upswing portion 48*d* of waveform 48 has a substantially steeper gradient than that of the original input signal rise portion 45*c*. To obtain this improved waveform, the resonant circuit 32 provides the damped waveform 46 to be summed with the waveform 44 in transistor 31. The resultant output signal waveform 48** provides an increase in the crispness, or definition, of the edge between black and white areas of the picture.

A further increased crispness of the picture may be obtained by providing an overshoot condition wherein the output waveform actually rises above the fully white condition at the end of the signal transition period. This overshoot condition is illustrated in FIG. 4 wherein the waveform 146 of the signal produced by the resonant circuit 32 rings in a controlled, damped manner. The waveform 46 shown in FIG. 3 represents an effectively critically damped condition of the resonant circuit 32 so that effectively minimum overshoot of the waveform at **46*a* occurs. To provide increased overshoot, the damping of the resonant circuit 32 may be decreased and, thus, as shown, a substantial overshoot portion 146*a* may be provided by a substantial ringing of the circuit. Such control of the damping may be effected by adjustably increasing the resistance 40**.

More specifically, the input signal 45 effectively drives input transistor 29 into saturation to develop a voltage pulse across resonant circuit 32. The rise time of the voltage pulse is very short and the corresponding frequency is much greater than the resonant frequency of the series connected inductor and capacitor. Thus, the series connection of the inductor 42 and capacitor 43 acts as a capacitance. This capacitance being connected in parallel with inductor 41 and resistor 40 defines an RCL resonant circuit. Where the circuit 11 utilizes the parameters set forth above, effectively critical damping of the resonant circuit results so that the waveform 46 is as shown in FIG. 3 with substantial minimum overshoot. By increasing the resistance value of resistor 40, however, a decrease in the damping of the resonant circuit 32 is obtained and ringing of the circuit produces overshoot characteristics such as shown at 146*a* in FIG. 4. The increase in resistance value of resistor 40 may be limited to produce in the output signal 148 a maximum overshoot 148*a* while yet avoiding an appreciable subsequent dip 148*b* below the white condition which would result in a wavering of the intensity of the white area in the picture. To provide the individual user with selective control of the overshoot condition, the resistor 40 may comprise a manually adjustable resistor of conventional construction.

The output waveform 48 or 148 is essentially independent of the input waveform 45 as the steepness of the rise portion is determined effectively primarily by the waveform 46 and only secondarily by the waveform 44 applied to the output transistor base 31*b*. The parameters of the resonant circuit 32 thus effectively control the shape of the output signal, and effectively provide the desired delay as well as preshoot and selective overshoot characteristics in the output waveform. In the illustrated waveforms, the input signal has approximately a 0.3 microseconds rise time whereas the transition between the initial black condition and the white condition requires approximately 0.6 microseconds. Resultingly, the delay is approximately 0.3 microseconds as desired.

The active delay circuit 11 is extremely simple and economical of construction while yet providing effective control of the desired time delay with facilitated overshoot control.

The foregoing disclosure of specific embodiments is illustrative of the broad inventive concepts comprehended by the invention.

I claim:

1. An active delay circuit for providing from a transient input signal a delayed output signal, comprising: a summing circuit for providing an output signal from a plurality of input component signals; first means for providing to said summing circuit a first input component signal having a transient waveform similar to the transient input signal waveform; and second means effectively defining a resonant RCL circuit responsive to the input signal for concurrently providing to said summing circuit a second input component signal comprising a generally sine wave excursion (a) opposite in polarity to, (b) initiated substantially concurrently with and (c) having a half wavelength period substantially greater than the rise period of said first input component transient signal.

2. The active delay circuit of claim 1 wherein said summing circuit includes a transistor, and said component signals are applied to the base thereof.

3. The active delay circuit of claim 1 wherein said first means comprises a transistor, said input signal being applied to the base thereof, said second means being connected to the collector thereof, and said summing circuit being connected to the emitter thereof.

4. The active delay circuit of claim 1 wherein said second means is connected to be actuated by said first means.

5. The active delay circuit of claim 1 wherein said second means is arranged to provide a said second input component signal comprising a damped ringing waveform wherein said excursion is followed by a relatively smaller-amplitude half-wave of polarity similar to that of said first input component signal.

6. The active delay circuit of claim 1 wherein said input signal defines a transition in amplitude level.

7. The active delay circuit of claim 1 further including means for adjusting said second means to provide a variable, damped ringing second input component signal.

8. An active delay circuit for deriving from a transient input signal a time delayed output signal with a preshoot characteristic and concurrent increase in the transient steepness, said circuit comprising means for summing a first transient component signal essentially similar to said input signal with a second component signal defining generally a sine wave excursion (a) opposite in polarity to, (b) initiated substantially concurrently with, and (c) having a half wavelength period substantially greater than the rise period of said first input transient component signal to define a time delayed output signal.

9. The active delay circuit of claim 8 further including means for summing the time delayed output signal with another signal, the time delay effected by said delay circuit being preselected to effectively synchronize arrival of said time delayed output signal and said another signal at the matrixing means.

10. The active delay circuit of claim 8 wherein said second component signal includes a relatively small-amplitude half-wave following said excursion of polarity similar to that of the first component signal to provide an overshoot characteristic in said time delayed output signal.

11. An active delay circuit for providing from an input signal having a rapid rise in amplitude level a delayed output signal, comprising:

an output transistor;

an input transistor having the input signal applied to the base thereof;

first resistance means connected between the emitter of the input transistor and the base of the output transistor;

a second resistance means connected between the collector of said input transistor and the base of said output transistor;

a parallel resonant circuit including (a) third resistance means, (b) a first inductance means, and (c) capacitance means, connected between said collector of the input transistor and the B+ power supply;

a fourth resistance means connected between the B+ power supply and the collector of said output transistor; and resistance means connected between the emitter of said output transistor and ground.

12. The active delay circuit of claim 11 wherein the component values are preselected to critically damp said resonant circuit and thereby prevent ringing.

13. The active delay circuit of claim 11 wherein the component values are preselected to provide a damped ringing of said resonant circuit.

14. The active delay circuit of claim 11 wherein said third resistance means comprises a manually adjustable resistance means and the component values are preselected to provide an adjustable damped ringing of said resonant circuit.

15. The active delay circuit of claim 11 wherein said capacitance means comprises a trap circuit including a series connected capacitance means and second inductance means preselected to resonate at a preselected frequency.

* * * * *